United States Patent [19]
Spitz et al.

[11] Patent Number: 5,322,600
[45] Date of Patent: Jun. 21, 1994

[54] METHOD AND APPARATUS FOR REMOVAL OF SELENIUM FROM SOLUTION

[75] Inventors: Robert A. Spitz, Holbrook, Mass.; Mark Bricker, Kutztown, Pa.

[73] Assignee: Pioneer Auto Parts & Service Co., Inc., Yeadon, Pa.

[21] Appl. No.: 43,537

[22] Filed: Apr. 6, 1993

[51] Int. Cl.$^5$ .................... C02F 1/46; H05F 3/00; C01B 13/10
[52] U.S. Cl. .................... 204/151; 204/152; 204/264; 204/276
[58] Field of Search ............ 204/152, 151, 150, 235, 204/238, 105 R, 240, 264, 276

[56] References Cited

U.S. PATENT DOCUMENTS

| | | | |
|---|---|---|---|
| 4,377,556 | 3/1983 | Hofirek | 423/42 |
| 4,948,489 | 8/1990 | Greenberg | 204/228 |

Primary Examiner—John Niebling
Assistant Examiner—Brendan Mee
Attorney, Agent, or Firm—John W. Logan, Jr.

[57] ABSTRACT

The present invention provides an improved method and apparatus for removing dissolved selenium from a wastewater solution. The apparatus treats heated selenium containing solution in a single, flow-through operation by employing both the anode chamber and cathode chamber of an electrolytic cell and a series of submicron filters. In operation, the present invention has proven to be very effective in treating selenium containing solution to meet or better the government toxicity characteristic specifications of $\leq 1$ ppm.

22 Claims, 2 Drawing Sheets

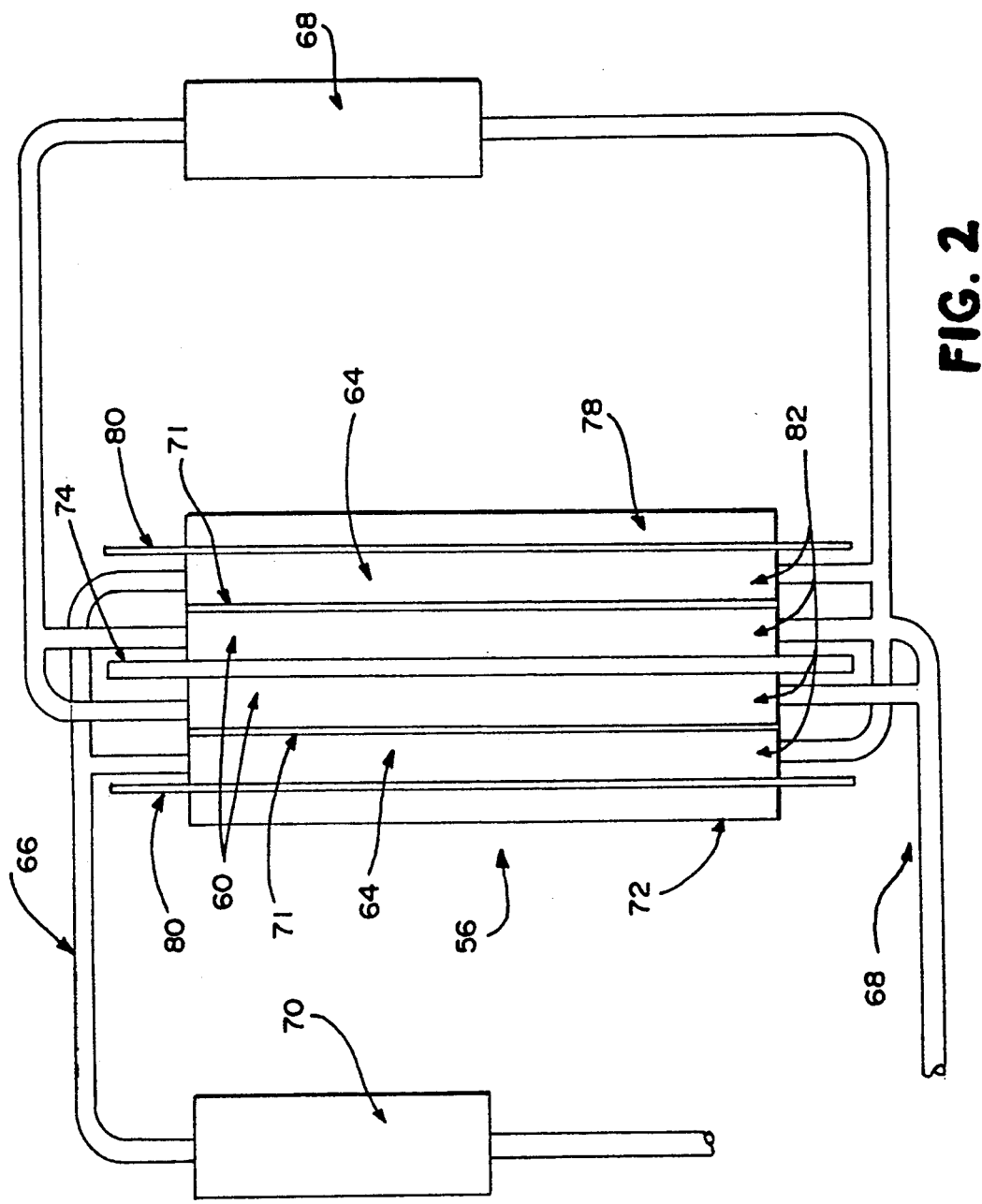

METHOD AND APPARATUS FOR REMOVAL OF SELENIUM FROM SOLUTION

BACKGROUND OF THE INVENTION

1. Field of the Invention

The present invention relates to method and apparatus for removing dissolved contaminants from a solution. More particularly, the present invention provides method and apparatus for electrolytically and mechanically removing selenium from a solution.

2. Background of the Prior Art

A common problem today is the reclamation of chemical solutions so that they may be reused or safely discarded. Toxicity characteristic tests established by the United States government have placed severe limits on the amount of contaminants which can be included in waste solutions to avoid the undesirable and costly designation of "hazardous substance."

Among the more difficult of contaminants to remove from solution is selenium (Se). Government toxicity characteristic (TCLP) specifications require that selenium in waste streams must be 1.0 ppm or less. Although these restraints have generated a great deal of interest in finding a method for removing selenium from solution, present methods for attempting to accomplish selenium removal are all considered far more complicated and costly than should be necessary.

Most examples of existing selenium removal techniques center around various chemical procedures. U.S. Pat. No. 3,933,635 issued Jan. 20, 1976, to Marchant employs a metallic reducing agent to remove selenium. Similarly, U.S. Pat. No. 4,222,999 issued Sep. 16, 1980, to Weir et al. uses a procedure of chemical reduction of $Se^{+6}$ to $Se^{+4}$ and a chemical co-precipitation of $Se^{+4}$ with ferrous iron or ferric oxide. U.S. Pat. No. 4,377,556 issued Mar. 22, 1983, to Hofirek also employs chemical co-precipitation, in this case with sulfur dioxide or sulphite solution. U.S. Pat. No. 4,910,010 issued Mar. 20, 1990, to Khalafalla employs bacterial induced bioreduction of $Se^{+6}$ to $Se^{+4}$, exchange reaction with pyrite ($FeS_2$), and burning. U.S. Pat. No. 4,915,928 issued Apr. 10, 1990, to Marcantonio employs an strong-base anion exchange resin to remove selenide ($S^{-2}$) from a wastewater effluent. U.S. Pat. No. 5,089,141 issued Feb. 18, 1992, to Murphy discusses using a chemical process for selectively removing organoselenium compounds and selenate ($Se^{+4}$) from water supplies.

One of the difficulties recognized in a number of the above patents is that selenium tends to occur in multiple valance states, compounding the difficulty in removing all of it from any given solution. In its natural state, selenium tends to occur as elemental selenium ($Se[0]$), and, in non-organic natural water systems, as selenite ($Se^{+4}$) and selenate ($Se^{+6}$). Moreover, in addition to $Se^{+4}$ and $Se^{+6}$, in some industrial waste solution streams selenium is also found in the negative valence state of selenide ($Se^{-2}$).

Accordingly, attempting to remove a substantial portion of dissolved selenium from a solution containing selenite, selenate, and selenide requires addressing both different positive valence states of $Se^{+4}$ and $Se^{+6}$ as well as the negative valence state of $Se^{-2}$. Even with the on-going interest in the problem of selenium removal reflected in the above patents, applicants are aware of no instance where such a removal can be readily accomplished without performing multiple independent treatment procedures.

Although electrolytic cells have been recognized as one method of removing certain dissolved impurities from some solutions, the relatively complex nature of mixed positive and negative valence states of selenium dissolved in industrial solutions complicates its removal using such techniques. When initially confronted with this problem, applicants attempted to employ an electrolytic cell, similar to that disclosed in applicants' U.S. Pat. No. 5,009,868, to remove selenium in the cathode compartment of the cell. Unfortunately, this method removed only some of the dissolved selenium and was completely inadequate in reaching necessary purity levels.

Examples of previous attempts to remove chemical impurities through electrolysis are illustrated in a number of issued United States Patents, such as U.S. Pat. Nos.: 3,506,560 issued Apr. 14, 1970, to Grangaard; 3,954,594 issued May 4, 1976, to Recht; 4,564,432 issued Jan. 14, 1986, to Nagai et al.; 4,963,241 issued Oct. 16, 1990, to Brattan; and 5,006,216 issued Apr. 9, 1991, to Dietrich et al. Although these devices may work well for their stated purposes, none of these patents attempt to address the problem of removing various forms of selenium from solution or how to deal with mixed positive and negative valence states of a dissolved metal.

Accordingly, it is a primary object of the present invention to provide an improved method and apparatus for readily removing dissolved selenium from a solution.

It is a further object of the present invention to provide such a method and apparatus which can effectively remove all forms of dissolved selenium from solution, including selenite, selenate, and selenide, in a single easily performed process.

It is an additional object of the present invention to provide such a method and apparatus which can accomplish effective selenium removal while producing minimal secondary waste in the removal procedure.

It is another object of the present invention to provide such a method and apparatus which require minimal investment to implement and operate, including functioning with minimal supervision and maintenance.

It is yet another object of the present invention to provide such a method and apparatus which can rapidly and effectively treat relatively high volumes of solution at minimal cost.

These and other objects of the present invention will become evident from review of the following specification.

SUMMARY OF THE INVENTION

The present invention provides a method and apparatus for electrolytically and mechanically removing dissolved selenium from solution.

In its simplest form, the present invention employs an electrolytic cell, including a cathode chamber and an anode chamber, a first sub-micron filter unit mounted on a transfer conduit between the two electrolytic chambers, and a second sub-micron filter unit mounted on the output end of the cell. Selenium containing solution, including dissolved selenium in the forms $Se^{-2}$, $Se^{+2}$, and $Se^{+4}$, is electrolyzed in the first electrolytic chamber, immediately filtered by the first sub-micron filter, electrolyzed in the second electrolytic chamber, and immediately filtered by the second sub-micron filter. Applying this procedure in an on-going test operation, selenium content has been consistently reduced to below the government TCLP Specification level of ≦1 ppm.

The present invention has proven to be highly successful at removing selenium rapidly and without complicated chemical procedures or any known harmful by-products. Moreover, the simplicity of the apparatus and method employed with the present invention allows it to be installed and operated with minimal cost and supervision.

DESCRIPTION OF THE DRAWINGS

The operation of the present invention should become apparent from the following description when considered in conjunction with the accompanying drawings, in which:

FIG. 2 is a cross-sectional view of another embodiment of an electrolytic cell employed in the present invention.

DETAILED DESCRIPTION OF THE INVENTION

Figure 1:
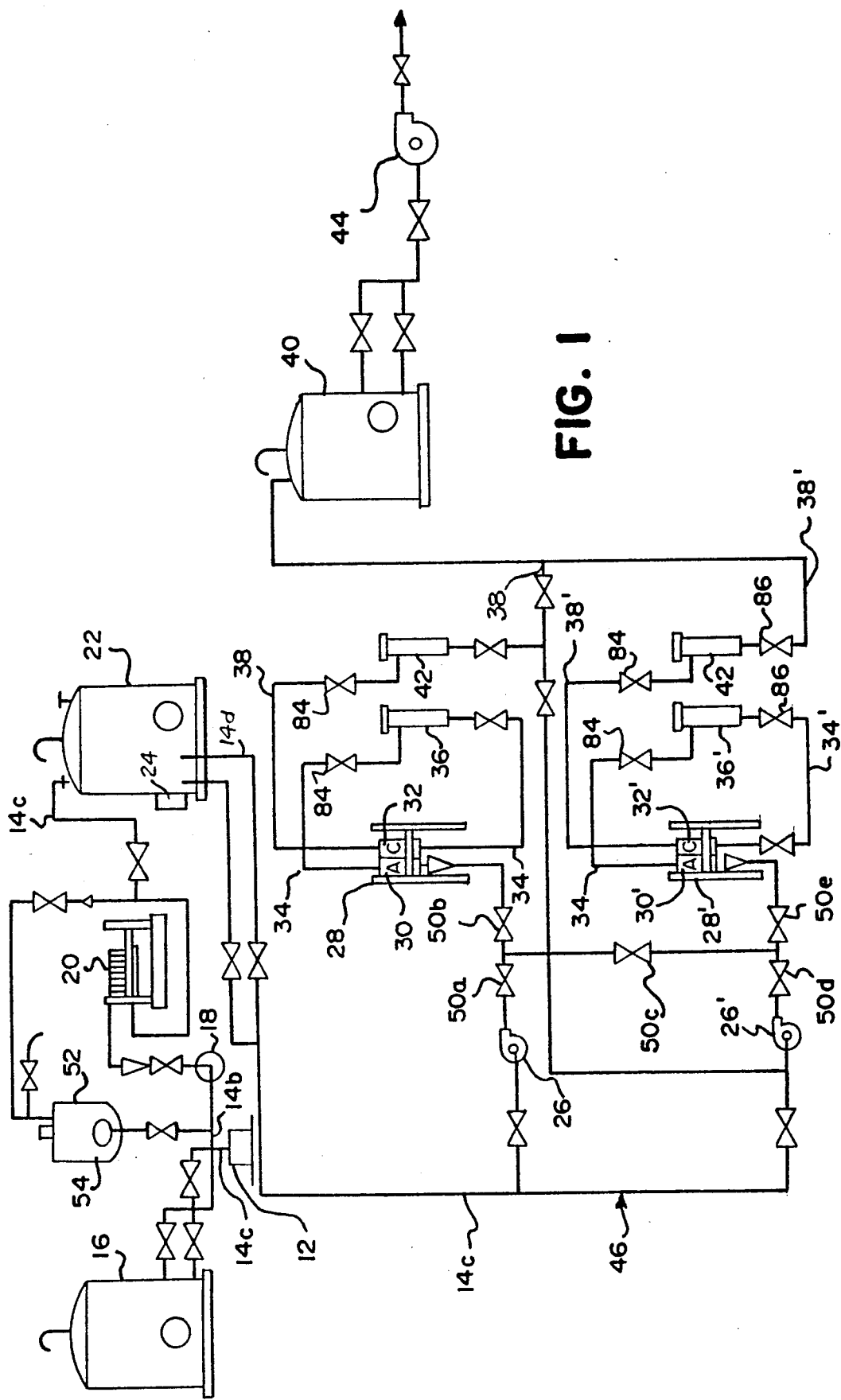
FIG. 1 is a schematic representation of an embodiment of the apparatus of the present invention.

The present invention provides apparatus and method for effectively removing dissolved selenium from a solution. Although it is believed that the present invention may be applied to remove selenium from virtually any solution, the present invention is particularly applicable to the treatment of industrial wastewater solutions, such as solutions containing sulfuric acid, as well as nitrogen sulfur solutions and solutions of ammonium sulfate, ammonium sulfite or ammonium bi-sulfite.

APPARATUS OF THE PRESENT INVENTION

Illustrated in FIG. 1 is one embodiment of apparatus 10 of the present invention connected to a source of chemical solution 12. In this embodiment, the present invention includes: a supply conduit 14 receiving chemical from the chemical source 12; a first storage tank 16; a first pump unit 18; a bulk filter unit 20; a second storage tank 22, including a heater 24 attached thereto; a second pump unit 26; an electrolytic cell 28, including a first electrolytic chamber 30 and a second electrolytic chamber 32; a transfer conduit 34 communicating between the first chamber 30 and the second chamber 32; a first sub-micron filter unit 36 on the transfer conduit 34; an output conduit 38 communicating between the electrolytic cell 28 and a down-stream facility, such as a storage tank 40; a second sub-micron filter unit 42 on the output conduit 38; and a third pump unit 44 for delivery of solution from storage tank 40 to an ultimate down-stream facility.

In basic operation of this apparatus, selenium containing solution is received through the supply conduit, treated in relatively high-speed continuous flow through the apparatus, and delivered through the output conduit substantially free of selenium contamination. Specifically, selenium containing solution is first supplied from a source of solution 12 though a first segment of the supply conduit 14a to first storage tank 16. Solution is driven, drawn or pumped, such as through pump 18, from the first storage tank 16 through a second segment of the supply conduit 14b and into the bulk filter unit 20.

The purpose of the bulk filter unit is to screen out any bulk solids which may be suspended in the solution. In this regard, a filter press which filters particles greater than 1-2 microns is believed to be adequate.

Solution exits the bulk filter unit 20 through a third segment of the supply conduit 14c and is transferred to second storage tank 22. As is explained below, the method of selenium removal of the present invention requires an elevated temperature of solution in the range of at least 90° to 120° F. Although solution from certain industrial applications may be supplied at a temperature within this range, the second storage tank 22 includes a thermostatically controlled heater unit 24 to assure that solution is at a desired elevated temperature. It should be appreciated that the temperature of solution may also be elevated through other means, including through use of a continuous flow heat exchanger.

Solution is drawn from the second storage tank 22 along the fourth segment of the supply conduit 14d by pump unit 26 and is supplied to a first electrolytic chamber 30 of the cell 28. Upon exiting the first electrolytic chamber 30 through transfer conduit 34, solution is filtered by first sub-micron filter unit 36 and is delivered to the second electrolytic chamber 32.

After treatment in the second electrolytic chamber 32, solution is transferred through the output conduit 38 and second sub-micron filter 42 to any desired downstream facility, such as storage tank 40, shipping drums (not shown), other treatment apparatus (not shown), or back into use in the industrial facility. For ease in dispensing from storage tank 40, pump unit 44 is provided.

In addition to the above described apparatus, a number of further options are shown on FIG. 1. To assure fail-safe operation, a second electrolyte system 46 is provided. This system 46 is mounted in parallel to the above described electrolytic cell 28 via supply conduit 14e and contains identical elements: a pump unit 26'; electrolytic cell 28', including a first electrolytic chamber 30' and a second electrolytic chamber 32'; a transfer conduit 34' communicating between the first chamber 30' and the second chamber 32'; third sub-micron filter unit 36' on the transfer conduit 34'; output conduit 38' communicating between the electrolytic cell 28' and a down-stream facility; and a fourth sub-micron filter unit 42' on the output conduit 38'. By supplying a second electrolytic system, the apparatus of the present invention can treat solution continuously, while allowing one or the other electrolytic cell 28, 28' or other components to be taken off-line for repair or regular service.

Contributing further protective redundancy to the present system, a jumper conduit 48 is provided to permit either pump 26 or pump 26' to deliver solution to either electrolytic cell 28 or 28'. Appropriate valves 50a, 50b, 50c, 50d, 50e are provided to direct solution flow in this regard.

Another optional element in the illustrated apparatus is a pre-coat tank 52 mounted in parallel with the bulk filter unit 20. One suitable form of bulk filter unit is a filter press employing diatomaceous earth (diatomite) as a porous filter aid. As is known, in such a filter unit a pre-coat tank 52, including an agitator 54 therein, is used to circulate diatomaceous earth through the filter press 20. It has been found that such a filter unit provides economical and effective solution pre-treatment in the context of the present invention.

The specific construction of one electrolytic cell which may be used in conjunction with the present invention is shown in FIG. 2. In this embodiment, electrolytic cell 56 includes intake conduit 58, anode compartment 60, transfer conduit 62, cathode compartment 64, and output conduit 66. A first sub-micron filter 68 is provided on the transfer conduit 62 and a second sub-micron filter 70 is provided on the output conduit 66.

The anode compartments 60 are housed within two containers 82 separated by an anode 74 constructed from a sheet of lead. The two anode compartments are separated from the cathode compartments 64 by semipermeable membranes 71. Each cathode compartment 64 is comprised of an end plate 72, a cathode 80 constructed from a sheet of lead and a container 82. Other suitable materials may be used in place of lead sheets for the anode 74 and cathodes 80. To increase the surface area at the anode and cathodes, each compartment 80 is packed with graphite particles 76 or an analogous material.

Although any suitable material may be used for the separator membrane, for most applications it is preferred to use a anion-selective membrane, such as material sold under the trademark "IONAC MA 3475 Anion Membrane" by Sybron Chemicals, Inc., Birmingham, N.J. Other battery separator-type materials which will prevent mixing of the solutions in the two chambers may likewise be employed, such as microporous polyethylene film, asbestos cloth, or glass frit.

Since the electrolytic cell of the present invention is completely symmetrical in design and operation, it should be understood that the difference between the "anode" chamber and the "cathode" chamber in the present invention is solely dependent upon the direction of current flow. It is preferable to have solution enter the anode chamber first and the cathode chamber second, as is illustrated with the designations "C" and "A" in the cells 28, 28' shown in FIG. 1 and FIG. 2.

With respect to the sub-micron filters 36, 36', 42, 42', 68, 70 employed in the present invention, these may take any appropriate form which will withstand attack by the treated solutions and will effectively remove particles down to a level of <1 microns. It is preferred that the filters are a micron spun polypropelene-type, such as a model 1PMX30 filter available from Filterpure Company of East Rutherford, N.J. To aid in the servicing of the apparatus of the present invention, as is shown in FIG. 1, each of the filters can be provided with isolation valves 84, 86 to allow each of the filters to be easily taken off-line and serviced or replaced.

The motivation of solution through the apparatus of the present invention can occur through any suitable means. As is shown, the preferred method is the use of one or more pumps, such as a centrifugal magnetic drive pump manufactured by March Mfg. Inc. Alternatively or in addition, solution may also be motivated through the system by employing existing line pressure, gravity feed, or any other similar method.

EXAMPLES OF THE PROCESS OF THE PRESENT INVENTION

By operating in the manner described above, the apparatus of the present invention can be arranged to receive selenium containing solution from virtually any source and effectively reduce its total dissolved selenium content. Unlike previous chemical-based selenium removal processes, however, with minimal operator attention and with virtually no harmful by-products, the present invention can reduce selenium in all of its common dissolved forms of $Se^{-2}$, $Se^{+2}$, and $Se^{+4}$ to below government specified purity levels.

By way of example, the following test results have been generated using the apparatus and method of the present invention:

EXAMPLE 1

Employing apparatus as above described, with a flow capacity of approximately 6 gallons/min., a sulfuric acid scrubber solution containing selenium was pre-filtered to remove particles as small as 1-2 microns. The temperature of the solution was elevated to approximately 120° F. and then introduced to the anode compartment of an electrolytic cell where approximately 550 Amps. of current was applied. After filtering through a first sub-micron filter removing particles as small as <1.0 micron, the solution was then treated in the cathode compartment of the same cell with the same current. Finally, the solution was filtered through a second sub-micron filter removing particles of less than 1.0 micron.

As so treated, the following results were achieved:

| Se Content: | Initial | After 1st Filter | After 2d Filter |
| --- | --- | --- | --- |
| | 5 ppm | 3 ppm | <1 ppm |

EXAMPLE 2

A series of similar sulfuric acid wastewater solutions containing selenium were tested, with treatment first occurring in the anode chamber and second occurring in the cathode chamber. Solution temperature was maintained in a range of 75° to 100° F. The following results were achieved:

| Se Content: | Initial | After 1st Filter | After 2d Filter |
| --- | --- | --- | --- |
| | 3 ppm | 1.4 ppm | 0.7 ppm |
| | 6 | 2.5 | 1.9 |
| | 9.9 | 2.2 | 1.0 |
| | 7.5 | 2.0 | 0.6 |

At the present time, the exact chemistry operating in the present invention remains uncertain. It is believed that the selenium contained in the solution as selenide $Se^{-2}$ is electrolytically oxidized to selenium metal in the anode compartment of the apparatus, forming fine particles in the solution. After filtering, the solution, now containing only selenite $Se^{+4}$ and selenate $Se^{+4}$ is electrolytically reduced to selenium metal in the cathode compartment of the apparatus, also forming fine particles. The second sub-micron filter removes these particles. An initial bench test cell has already continuously treated well over 15,000 gallons of wastewater solution, with an initial selenium content of 3-10 ppm, and continues consistently to deliver solution with a selenium content of less than 1 ppm. Temperature of solution entering the cell is maintained in the range of 90° to 115° F. Due to the on-going success of this cell and the desire to continue to test the cell until failure is achieved, applicants have been unable to analyze the cell and its component parts to determine precisely where the selenium is being removed. Analysis of the material collected by the sub-micron filter units has shown extremely high quantities of metallic selenium.

Although particular embodiments of the present invention are disclosed herein, it is not intended to limit the invention to such a disclosure and changes and modifications may be incorporated and embodied within the scope of the following claims.

What is claimed is:

1. A process for removing dissolved selenium including selenide $Se^{-2}$, selenite $Se^{+4}$ and selenate $Se^{+6}$ from a stream of solution, which comprises:
   - passing the solution through a first electrolytic chamber serving as an anode chamber;
   - oxidizing the $Se^{-2}$ to selenium metal in the anode chamber;
   - passing the solution through a second electrolytic chamber serving as a cathode chamber;
   - reducing the $Se^{+4}$ and $Se^{+6}$ to selenium metal in the cathode chamber; and
   - filtering the selenium metal from the stream of solution by a sub-micron filter.

2. The process of claim 1 wherein the stream of solution is passed through a first sub-micron filter upon leaving the first electrolytic chamber and is passed through a second sub-micron filter upon leaving the second electrolytic chamber.

3. A process for removing dissolved selenium from a stream of solution, which comprises:
   - providing an electrolytic cell, including a first electrolytic chamber, a second electrolytic chamber, and a semi-permeable membrane separating the chambers;
   - providing a supply conduit from a source of solution to the first electrolytic chamber;
   - providing a transfer conduit from the first electrolytic chamber to the second electrolytic chamber;
   - providing an output conduit from the second electrolytic chamber to a down-stream facility;
   - providing a filter on the supply conduit to screen solution before it enters the electrolytic cell;
   - providing a first sub-micron filter on the transfer conduit to screen solution passing between the first electrolytic chamber and the second electrolytic chamber;
   - providing a second sub-micron filter on the output conduit to screen solution exiting the second electrolytic chamber;
   - delivering the stream of solution containing selenium through the supply conduit;
   - filtering the solution before it enters the electrolytic cell to remove particulate matter;
   - supplying an electric current through the electrolytic cell;
   - passing the solution through the first chamber to cause some of the dissolved selenium to precipitate from the solution;
   - filtering the solution in the first filter to remove suspended precipitated selenium;
   - passing the solution through the second chamber to cause some of the dissolved selenium to precipitate from the solution;
   - filtering the solution through the second filter to remove the suspended precipitated selenium; and
   - delivering solution to the down-stream facility substantially free of selenium contamination.

4. The process of claim 3 which further comprises
   - adapting the one of the electrolytic chamber to serve as an anode chamber and the other electrolytic chamber to serve as a cathode chamber;
   - providing a solution containing selenium in multiple valence states, including $Se^{-2}$, $Se^{+4}$, and $Se^{+6}$;
   - oxidizing the $Se^{-2}$ to selenium metal in the anode chamber;
   - removing suspended selenium metal generated by oxidation in the one of the sub-micron filters;
   - reducing the $Se^{+4}$ and $Se^{+6}$ to selenium metal in the cathode chamber; and
   - removing suspended selenium metal generated by reduction in the other sub-micron filter.

5. The process of claim 3 which further comprises providing the solution to the electrolytic cell at an elevated temperature.

6. The process of claim 5 wherein the elevated temperature comprises a temperature of at least 90° F.

7. The process of claim 6 wherein the elevated temperature comprises a temperature of at least 120° F.

8. The process of claim 3 which further comprises
   - providing means to increase the temperature of the solution in the supply conduit to at least 120° F.;
   - adapting one of the electrolytic chambers to serve as an anode chamber and the other electrolytic chamber to serve as a cathode chamber;
   - providing a solution containing selenium in multiple valence states, including $Se^{-2}$, $Se^{+4}$, and $Se^{+6}$;
   - oxidizing the $Se^{-2}$ to selenium metal in the anode chamber;
   - removing suspended selenium metal generated by oxidation in one of the sub-micron filters;
   - reducing the $Se^{+4}$ and $Se^{+6}$ to selenium metal in the cathode chamber; and
   - removing suspended selenium metal generated by reduction in the other sub-micron filter.

9. The process of claim 8 which further comprises providing a semi-permeable membrane between the anode and cathode chambers that is anion-selective.

10. The process of claim 8 which further comprises
    - providing a lead anode in the anode chamber and a lead cathode in the cathode chamber; and
    - packing both the anode chamber and the cathode chamber with crushed graphite to increase the surface area for electrolytic reaction.

11. The process of claim 3 which further comprises
    - providing fluid flow through the cell at a rate of approximately 5 gallons per minute per cubic foot; and
    - applying a current through the cell at an amperage of approximately 70 amps per square foot of membrane area.

12. The process of claim 3 wherein the solution delivered to the down-stream facility substantially free of selenium contamination contains a dissolved selenium concentration of $\leq 1.0$ ppm.

13. Apparatus for the removal of dissolved selenium from a stream of solution, which comprises:
    - an electrolytic cell, including a first electrolytic chamber, a second electrolytic chamber, and a semi-permeable membrane separating the chambers;
    - a supply conduit from a source of solution to the first chamber of the electrolytic cell, including a filter thereon for removing particulate contamination;
    - a transfer conduit from the first electrolytic chamber to the second electrolytic chamber, including a first sub-micron filter thereon;
    - an output conduit from the second electrolytic chamber to a down-stream facility, including a second sub-micron filter thereon;
    - wherein the apparatus is adapted to receive a stream of solution containing selenium, electrolyze the solution in the first electrolytic chamber, remove suspended precipitated selenium in the first submicron filter, electrolyze the solution in the second electrolytic chamber, remove suspended precipitated selenium in the second sub-micron filter, and deliver solution substantially free of selenium contamination to the down-stream facility.

14. The apparatus of claim 13 wherein the semipermeable membrane comprises an anion-selective membrane.

15. The apparatus of claim 13 wherein the electrolytic cell includes a lead anode in the first electrolytic chamber and a lead cathode in the second electrolytic chamber.

16. The apparatus of claim 15 wherein both the first electrolytic chamber and the second electrolytic chamber are packed with crushed graphite.

17. The apparatus of claim 13 wherein a heater is provided to elevate the temperature of the solution prior to entering the electrolytic cell.

18. The apparatus of claim 17 wherein the heater is adapted to elevate the temperature of the solution entering the electrolytic cell to at least 90°–120° F.

19. The apparatus of claim 13 wherein a second electrolytic cell is provided and connected between the supply conduit and the down-stream facility in parallel with the electrolytic cell.

20. The apparatus of claim 19 wherein the second electrolytic cell includes a second transfer conduit and a third sub-micron filter on the second transfer conduit.

21. The apparatus of claim 20 wherein the second electrolytic cell includes a second output conduit and a fourth sub-micron filter on the second output conduit.

22. The apparatus of claim 13 wherein included on the supply conduit is a storage tank including a heater therein to store and pre-heat solution prior to introduction into the electrolytic cell.

* * * * *